United States Patent [19]
Aoki et al.

[11] Patent Number: 5,449,565
[45] Date of Patent: Sep. 12, 1995

[54] MAGNETIC IRON OXIDE PARTICLES, A PROCESS FOR PRODUCING THE SAME AND A MAGNETIC RECORDING MEDIUM

[75] Inventors: Koso Aoki; Hiroshi Sumita; Nanao Horiishi, all of Hiroshima, Japan

[73] Assignee: Toda Kogyo Corporation, Hiroshima, Japan

[21] Appl. No.: 12,164

[22] Filed: Jan. 28, 1993

[30] Foreign Application Priority Data

Feb. 5, 1992 [JP] Japan ............................ 4-056370

[51] Int. Cl.$^6$ .............................................. G11B 5/16
[52] U.S. Cl. ............................ 428/694 BA; 428/403; 106/403; 106/456; 148/105; 252/62.56; 423/594; 423/633; 427/216; 427/217
[58] Field of Search ............... 428/403, 694 BA; 106/403, 456; 148/105; 252/62.54, 62.56; 423/594, 633; 427/216, 217

[56] References Cited

U.S. PATENT DOCUMENTS

| | | | |
|---|---|---|---|
| 4,296,149 | 10/1981 | Rudolf et al. | 427/130 |
| 4,876,022 | 10/1989 | Yamazaki et al. | 252/62.56 |
| 4,923,519 | 5/1990 | Rodi et al. | 106/459 |
| 5,188,898 | 2/1993 | Tagawa et al. | 428/403 |

FOREIGN PATENT DOCUMENTS

92/02940  2/1992  WIPO.

OTHER PUBLICATIONS

*Chemical Abstracts*, vol. 116, No. 2, Jan. 13, 1992, Columbus, Ohio; Ohashi et al.: "Synthesis of magnetite and analogous spinel-type iron oxides and their characterization," p. 553, col. 2.
*Chemical Abstracts*, vol. 91, No. 27, Dec. 10, 1979, Columbus, Ohio, Baszynski et al.: "Domain structure and magnetic anistropy in mono-crystalline epilayer of ferrite with spinel structure," p. 707, col. 2.
*Chemical Abstracts*, vol. 83, No. 14, Oct. 6, 1975, Columbus, Ohio, Oudet: "Crystal structure and saturation magnetic moment at 0 degree K spinel ferrites RFe204 (R=metal)," p. 761, col. 2.
*Chemical Abstracts*, vol. 87, No. 6, Aug. 8, 1977, Columbus, Ohio, Mollard et al.: "Physico-chemical properties of new particles of sold solutions between iron sesquinoxide and divalent spinel ferrites for magnetic recording," p. 567, col. 1.
*Chemical Abstracts*, vol. 88, No. 14, Apr. 3, 1978, Columbus, Ohio, Kiyama: "The formation of manganese and cobalt ferrites by the air oxidation of aqueous suspension and their properties," p. 602, col. 1.
*Chemical Abstracts*, vol. 100, No. 22, May 28, 1984, Columbus, Ohio, Kiselev et al.: "Calculation and prediction of composition-property dependences for multicomponent solid solutions. II. Deviation of fundamental ratios for spinel solutions," p. 557, col. 2.

*Primary Examiner*—Paul J. Thibodeau
*Assistant Examiner*—R. Follett
*Attorney, Agent, or Firm*—Nixon & Vanderhye

[57] ABSTRACT

Disclosed herein are magnetic composite iron oxide particles comprising spinel-type $Fe_3O_4$ particles as core particles and spinel-type $CoFe_2O_4$ outerlayer of the composite iron oxide particles, a process for producing the same, and a magnetic recording medium comprising a substrate and a magnetic recording layer containing the said magnetic iron oxide particles.

18 Claims, 5 Drawing Sheets

MAGNETIC IRON OXIDE PARTICLES, A PROCESS FOR PRODUCING THE SAME AND A MAGNETIC RECORDING MEDIUM

BACKGROUND OF THE INVENTION

The present invention relates to magnetic iron oxide particles, a process for producing such particles and a magnetic recording medium. More particularly, the present invention relates to magnetic iron oxide particles showing black in color, having a high coercive force and being also excellent in magnetic and chemical stability, a process for producing such particles, and a magnetic recording medium comprising a substrate and a magnetic recording layer containing the said magnetic iron oxide particles.

With a recent tendency toward miniaturization and lightweight of the magnetic recording and reproduction device, requirements are increasing for higher performance of the magnetic recording media such as magnetic tapes and discs. Such magnetic recording media are generally produced by coating a resin composition containing magnetic particles on a substrate, and it is known that the properties of the magnetic recording media are closely concerned with the magnetic particles used. It is required of the magnetic recording media to be not only high in recording density, sensitivity and output, but also excellent in magnetic and chemical stability. For satisfying these requirements on magnetic recording media, it is necessary that the magnetic iron oxide particles used for the said recording media possess a high coercive force, are colored in black and also have an excellent magnetic and chemical stability.

This fact is described in Japanese Patent Publication (Kokoku) No. 55-6580 (1980) as "In recent years, there has been a tendency that the wavelength of the recording signals shifts into the short wavelength region, and this tendency is remarkable with the video cassette tape recording media. Thus, the magnetic recording media are required to be enhanced in recording density and output, especially improved in frequency characteristics and magnetic stability. For satisfying these requirements on magnetic recording media, the magnetic material used therefor demands to have magnetic stability and high coercive force (Hc)."

Also, for improving recording density characteristics of magnetic recording media, it is necessary to enhance coercive force of magnetic recording media, and for that reason, the magnetic particles are required to have as high a coercive force as possible. This fact is described in "Electronic Communication Society Technical Research Reports" MR77-36 (1978) page 37 as "In order to increase recording density of magnetic tapes, it is necessary to enhance coercive force of the magnetic particles used in the tapes."

Co-doped type magnetic iron oxide particles and Co-coated type magnetic iron oxide particles are known as the magnetic particles having high coercive force. The Co-doped type magnetic iron oxide particles can be obtained by adding a Co salt in the course of the reaction for producing magnetite particles, or by adding a Co salt in the course of the reaction for producing goethite particles and then reducing the obtained Co-containing goethite particles to produce the Co-containing magnetite particles, and if necessary, further oxidizing to produce the Co-containing magnetite particles. The Co-coated type magnetic iron oxide particles can be obtained by coating the surface of precursor particles comprising magnetite particles obtained by reducing the goethite particles which are the starting material or comprising magnetite particles obtained by oxidizing the said magnetite particles, with a Co compound.

As is well known in the art, the Co-doped type magnetic iron oxide particles are very unstable magnetically and chemically.

Co-coated type magnetic iron oxide particles, as compared with Co-doped type particles, are fairly excellent in magnetic and chemical stability, and especially those obtained by using magnetite particles as precursor particles, as compared with those obtained by using magnetite particles as precursor particles, have a high coercive force and a high saturation magnetization, and are relatively stable against pressure, so that the Co-coated type magnetite particles are expected as magnetic iron oxide particles for magnetic recording.

It is known, however, that Co-coated type magnetite particles, although stable as compared with Co-doped type magnetic iron oxide particles, are still generally unstable magnetically and chemically due to the presence of $Fe^{2+}$ in the particles. This phenomenon is described in Japanese Patent Publication (Kokoku) No. 55-6580 (1980) as "Cobalt-containing acicular magnetite particles are high in both coercive force and saturated flux density . . . and their use as magnetic material for magnetic recording is expected, but on the other hand, they have the defect that a change of coercive force with the passage of time is large as they contain $Fe^{2+}$." and ". . . when the cobalt-containing acicular magnetite particles are taken out into the air, they are oxidized to reduce $Fe^{2+}$ therein less than the stoichiometrical amount, causing formation of defects in the crystal lattice. When these cobalt-containing acicular magnetite particles are allowed to stand at room temperature, there takes place migration of the cat ions ($Fe^{2+}$, $Co^{2+}$) to the stable positions through the defects, causing gradual increase of coercive force with the passage of time . . . . The change of coercive force with the passage of time, when the cobalt-containing acicular magnetite particles are left at room temperature, is associated with the coordination of ions in the crystal lattice . . . . When they are allowed to stand at room temperature, there takes place migration of $Fe^{2+}$ and $Co^{2+}$ to the stable positions through the defects, and as a result there occurs the change of coercive force with the passage of time."

Thus, when the Co-coated magnetite particles are heated to a certain temperature, the coercive force of the particles changes after heating and the coercive force after cooling to room temperature is not the same as that before heating. When the Co-coated magnetite particles are allowed to stand for a certain period of time, there take place such phenomena as the increase of coercive force with the passage of time, the reduction of saturation magnetization with the passage of time (hereinafter referred to as magnetic unstability) and the decrease of $Fe^{2+}$ with the passage of time (hereinafter referred to as chemical unstability).

Thus, in the case of the magnetic recording media obtained by using Co-coated type magnetite particles, when heated to a certain temperature, the coercive force after heating is not the same as that before heating, and when allowed to stand for a certain period of time, there take place such phenomena as the increase of coercive force and squareness (Br/Bm) with the passage of time, the decrease of saturated flux density Bm with the passage of time, and the increase of light transmittance with the passage of time.

On the other hand, stoppage of running of magnetic recording media such as magnetic tapes, especially video tapes, is effected by detecting a high light transmittance portion of the recording medium by a video deck. Recently, with enhancement of performance of the magnetic recording media, there has been an increasing technological tendency toward smaller thickness of magnetic recording media and smaller particle size of magnetic iron oxide particles dispersed in the recording layer, and as a result, there arises the problem that light transmittance of the magnetic recording layer is increased and it is difficult to detect the high light transmittance portion by the video deck.

As a solution to this problem, it is tried to add carbon black powder in the magnetic recording layer, thereby reducing light transmittance. Thus, in manufacture of the current video tapes, it is essential to add carbon black powder in the magnetic recording layer. In manufacture of magnetic recording media, however in the case where carbon black powder is added when forming a coating composition by mixing the magnetic particles and a binder resin, there arises the problem that dispersion of the magnetic particles in the vehicle is disturbed, causing deterioration of orientation and packing property of the magnetic particles in the coat. Further, carbon black powder has difficulties in handling because of low bulk density, which is around 0.1 g/cm$^3$ and thus is bad in workability Also, the problems of safety and sanitation, such as carcinogenicity, are pointed out. When using the magnetic particles containing a superparamagnetic iron oxide disclosed in Japanese Patent Publication (Kokoku) Nos. 58-18766 (1983) and 60-12286 (1985), the dispersibility in the vehicle is improved but the effect of reducing the light transmittance is unsatisfactory.

Thus, addition of carbon black powder which does not participate in magnetism is contrary to the purpose of elevating performance of magnetic recording media, so that it is tried to reduce the carbon powder content as much as possible by using Co-coated magnetite particles which have a higher blackness degree than Co-coated magnetite particles, as the magnetic iron oxide particles to be dispersed in the magnetic recording layer.

It is known that the blackness degree of Co-coated magnetite particles is influenced mainly by Fe$^{2+}$ content and the blackness degree tends to rise as Fe$^{2+}$ content increases. This fact described in "Powders and Powder Metallurgy", Vol. 26, No. 7, pp. 239-240, as "The blackness degree of the sample is affected by Fe(II) content and average particle size, and the particles with average particle size of 0.2 $\mu$m is bluish black and is most suited for use as black pigment. . . . When Fe(II) content is not less than 10 wt %, all the samples are black although a slight difference is noted in the blackness degree. When the Fe (II) content reduces to not more than 10 wt % each sample turns from black to reddish brown." The Co-coated type magnetite particles which were decreased in Fe$^{2+}$ content after allowed to stand for a certain period of time are reduced in blackness degree, and when such Co-coated magnetite particles are used, it is impossible to obtain magnetic recording media with sufficiently low light transmittance.

Many attempts have been made for improving magnetic and chemical stability of Co-coated magnetite particles. For example, a method has been proposed in which a preliminary coat composed of Fe$_3$O$_4$ or a non-stoichiometric compound is formed on the surfaces of core particles of iron oxide represented by the formula: FeO$_x$ (x=1.33-1.5) and an additional coat of cobalt hydroxide is formed on the said preliminary coat (Japanese Patent Application Laid-Open (Kokai) No. 63-74920 (1988)).

Thus, the magnetic iron oxide particles having high coercive force, black in color and also stable magnetically and chemically are desiderated in the art at present. The magnetic iron oxide particles disclosed in the above-mentioned Japanese Patent Application Laid-Open (Kokai) No. 63-74920 hardly satisfy all of the said properties required.

The magnetic iron oxide particles disclosed in the above-mentioned Japanese Patent Application Laid-Open (Kokai) No. 63-74920 are designed to minimize the decrease of coercive force by the temperature and quite different in action and effect from the present invention which is intended to afford a reversibility to coercive force in the magnetic iron oxide particles after heating and to improve magnetic stability of coercive force and saturation magnetization and chemical stability of Fe$^{2+}$. Also, the magnetic iron oxide particles described in the abovementioned Japanese Kokai are less in Fe$^{2+}$ content and low in blackness degree, and the magnetic recording media produced by using such magnetic iron oxide particles are high in light transmittance and poor in magnetic and chemical stability due to the properties of the magnetic iron oxide particles used.

The technical problem of the present invention, therefore, is to obtain the magnetic iron oxide particles having a high coercive force, and being black in color and stable magnetically and chemically.

As the result of strenuous studies of the present inventors, it has been found that by adding a mixed solution containing Co$^{2+}$ and Fe$^{2+}$ or a suspension containing hydroxides of Co$^{2+}$ and Fe$^{2+}$ in an amount of from not less than 2 moles to less than 3 moles of Fe$^{2+}$ based on one mole of Co$^{2+}$, to an alkaline dispersion with pH of not less than 10 in which Fe$_3$O$_4$ particles are dispersed, while passing an oxygen-containing gas at a temperature between 50° C. and boiling point, in such a way that the total concentration of Co ions and Fe ions in the alkaline dispersion is in the range of more than 0.005M to less than 0.5M, the obtained spinel-type composite particle comprises spinel-type Fe$_3$O$_4$ particle as a core particle thereof and a spinel-type CoFe$_2$O$_4$ outerlayer of the spinel-type composite particle, and is black in color, high in coercive force and stable magnetically and chemically. The present invention has been achieved on the basis of this finding.

SUMMARY OF THE INVENTION

The object of the present invention is to provide magnetic iron oxide particles which are block in color, high in coercive force and stable magnetically and chemically.

The another object of the present invention is to provide a magnetic recording medium which have a high coercive force, and are low in light transmittance and also excellent in magnetic and chemical stability.

In a first aspect of the present invention, there is provided a magnetic composite iron oxide particle comprising a core particle composed of spinel-type Fe$_3$O$_4$ and an outerlayer composed of spinel-type CoFe$_2$O$_4$.

In a second aspect of the present invention, there is provided a process for producing magnetic iron oxide particles which comprises adding a mixed solution containing $Co^{2+}$ and $Fe^{2+}$ or a suspension containing hydroxides of $Co^{2+}$ and $Fe^{2+}$ in an amount of from not less than 2 moles to less than 3 moles of $Fe^{2+}$ based on one mole of $Co^{2+}$ to an alkaline dispersion with pH of not less than 10 in which $Fe_3O_4$ particles are dispersed, while passing an oxygen-containing gas through said dispersion at a temperature between 50° C. and boiling point, in such a way that the total concentration of Co ions and Fe ions (the total sum of $Co^{2+}$ and $Fe^{2+}$) in said alkaline dispersion is in the range of 0.005M to 0.5M.

In a third aspect of the present invention, there is provided a magnetic recording medium comprising a substrate, and a recording layer which contains the magnetic composite iron oxide particles defined in the first aspect and is formed on the surface of the substrate.

DETAILED DESCRIPTION OF THE INVENTION

The magnetic iron oxide particles according to the present invention are spinel-type composite particles in which (1) crystals of spinel-type $CoFe_2O_4$ epitaxially grow on the crystal planes of $Fe_3O_4$ particles, or (2) crystals of Fe and Co-containing spinel-type oxide epitaxially grow on the crystal planes of $Fe_3O_4$ particles and then crystals of spinel-type $CoFe_2O_4$ epitaxially grow thereon.

It is imperative that the surface of the magnetic iron oxide particle according to the present invention is composed of $CoFe_2O_4$. If the composition of the surface thereof is not $CoFe_2O_4$, it is impossible to obtain the magnetic iron oxide particles with an excellent magnetic and chemical stability in the present invention.

It is imperative that the core particle in the present invention is composed of $Fe_3O_4$. When the core particle having many defects in the crystal lattice are used, it is impossible to obtain the magnetic iron oxide particles with an excellent magnetic and chemical stability. Also, the blackness degree of the particles lowers.

An intermediate layer composed of Fe and Co-containing spinel-type oxide at a Fe/Co ratio of more than 2 may be disposed between the $CoFe_2O_4$ outerlayer and the surface of the core particle.

As for the amount of $CoFe_2O_4$ in the present invention, it is sufficient that the surface of the magnetic composite iron oxide particle is composed of at least single phase of $CoFe_2O_4$ crystal, and specifically it is preferably 10 to 80 wt %, more preferably 15 to 75 wt % based on the composite iron oxide particle, to obtain the magnetic composite iron oxide particles with excellent magnetic and chemical stability designed to provide in the present invention.

As for the amount of the intermediate layer, it may be at least single phase composed of Fe and Co-containing spinel-type oxide [Fe/Co>2], which covers on the surface of the core particle and it is preferably not more than 26 wt % based on the composite iron oxide particle.

The magnetic iron oxide particles according to the present invention have a coercive force of 100 to 3,000 Oe when the core particles are granular particles, and a coercive force of 400 to 3,000 Oe when the core particles are acicular or spindle particles.

As the $Fe_3O_4$ particles in the present invention, there can be used any of the following: (1) granular $Fe_3O_4$ particles produced from an aqueous solution by a wet process in which an ferrous precipitate obtained by reacting an aqueous solution of ferrous salt and an aqueous alkali solution such as an aqueous solution of alkali hydroxide or alkali carbonate is air-oxidized; (2) granular $Fe_3O_4$ particles produced from an aqueous solution by a wet process in which a suspension containing iron (III) oxide hydroxide particles or iron (III) oxide particles and ferrous hydroxide and having a pH of not less than 6, preferably 8 to 14 is heated at a temperature of not less than 40° C., preferably 60° to 100° C.; (3) acicular magnetite particles produced from an aqueous solution by a wet process in which the acicular magnetite particles obtained by dehydrating the acicular lepidocrocite particles under heating at a temperature of 200 to 500° C., preferably 250° to 450° C. is dispersed in an alkaline suspension containing ferrous hydroxide colloid, and the resultant suspension is stirred under heating at a temperature of 40° to 100° C., preferably 60° to 100° C. in a non-oxidizing atmosphere; (4) acicular or spindle $Fe_3O_4$ particles obtained by a dry process in which the ferrous precipitate obtained by reacting an aqueous solution of ferrous salt and an aqueous alkali solution such as an aqueous solution of alkali hydroxide or alkali carbonate is air-oxidized and the resulting acicular or spindle iron (III) oxide hydroxide particles are reduced under heating at a temperature of 200° to 500° C. in a reducing atmosphere.

For preventing or controlling oxidation of $Fe^{2+}$ in the $Fe_3O_4$ particles, it is preferable to use the magnetite particles produced from an aqueous solution by a wet process in the form as they are. These granular magnetite particles may be of any pertinent shape such as spherical, hexahedral, octahedral, etc., and their size may be from 0.01 to 0.5 μm, preferably 0.05 to 0.4 μm in average particle diameter.

In the present invention, as the acicular or spindle $Fe_3O_4$ particles, there may be used those having an average particle length of 0.01 to 0.5 μm, preferably 0.01 to 0.3 μm, more preferably 0.05 to 0.3 μm, and an aspect ratio (average particle length/average particle width) of not less than 2, preferably 5 to 20, which are commonly used as magnetic iron oxide particles in magnetic recording media.

In effecting the crystal epitaxial-growth of $CoFe_2O_4$, it is imperative that the $Fe_3O_4$ particles used as core particles are not oxidized with oxygen in the air. In case where the wet process is employed, the reaction solution in which the $Fe_3O_4$ particles have been formed is used as it is, to effect the crystal epitaxial-growth of $CoFe_2O_4$. In case where the dry process is employed, the core particles obtained is once taken out into a container substituted with inert gases such as nitrogen, and then the crystal epitaxial-growth of $CoFe_2O_4$ is allowed to take place.

For effecting the crystal epitaxial-growth of $CoFe_2O_4$ on the surfaces of the $Fe_3O_4$ particles in the present invention, it is imperative that a mixed solution containing $Co^{2+}$ and $Fe^{2+}$ or a suspension containing hydroxides of $Co^{2+}$ and $Fe^{2+}$ be prepared so that the molar ratio of $Fe^{2+}$ to $Co^{2+}$ is not less than 2 to less than 3, preferably 2 to 2.8, and that the resultant mixed solution or suspension be added to the alkaline dispersion while controlling the concentrations of $Co^{2+}$ ions and $Fe^{2+}$ ions in the resultant alkaline dispersion, so that the total concentration of $Co^{2+}$ and $Fe^{2+}$ is in the range of 0.005M to 0.5M, preferably 0.01 to 0.4M.

When the compositionally adjusted mixed solution containing $Co^{2+}$ and $Fe^{2+}$ or suspension containing hydroxides of $Co^{2+}$ and $Fe^{2+}$ is not used, it is difficult to effect an intended crystal epitaxial-growth of $CoFe_2O_4$.

The mixed solution containing $Co^{2+}$ and $Fe^{2+}$ can be formed by mixing an aqueous solution of Co salt and an aqueous solution of ferrous salt, and the suspension containing hydroxides of $Co^{2+}$ and $Fe^{2+}$ can be formed by reacting an aqueous solution of Co salt, an aqueous solution of ferrous salt and an alkali hydroxide.

As the aqueous solution of Co salt, there can be used an aqueous solution of cobalt sulfate, cobalt chloride or the like.

As the aqueous solution of ferrous salt, there can be used an aqueous solution of ferrous sulfate, ferrous chloride or the like.

As the alkali hydroxide, there can be used sodium hydroxide, potassium hydroxide and the like.

The order of addition of the aqueous solution of Co salt, aqueous solution of ferrous salt and alkali hydroxide is not specified in the present invention, and either of them may be added first, or they may be added simultaneously.

When the $Fe^{2+}/Co^{2+}$ ratio in the mixed solution containing $Co^{2+}$ and $Fe^{2+}$ or the suspension containing hydroxides of $Co^{2+}$ and $Fe^{2+}$ is less than 2, unreacted $Co(OH)_2$ may remain in the reaction mother liquor even if the oxidation reaction is conducted for a long time, and may be contaminated in the magnetic iron oxide particles, so that it is difficult to obtain the magnetic iron oxide particles with excellent magnetic and chemical stability which are intended to provide in the present invention. When the $Fe^{2+}/Co^{2+}$ ratio is not less than 3, the particles obtained is magnetically and chemically unstable.

In the present invention, the concentration of Co ions and Fe ions in the alkaline dispersion at the time of addition is in the range of more than 0.005M to less than 0.5M in total of $Co^{2+}$ and $Fe^{2+}$. When the concentration is not less than 0.005M, the crystal epitaxial-growth of $CoFe_2O_4$ is insufficient, and it is difficult to obtain the magnetic iron oxide particles with excellent magnetic and chemical stability in the present invention. When the concentration is not less than 0.5M, although it is possible to effect the crystal epitaxial-growth of $CoFe_2O_4$ on the core particles, a long time may be required for such crystal epitaxial-growth of $CoFe_2O_4$, and also $CoFe_2O_4$ may separate out singly and sediment.

In the present invention, the crystal epitaxial-growth of $CoFe_2O_4$ is effected by passing an oxygen-containing gas through the alkaline dispersion with a pH of not less than 10, preferably 11 to 14 at a temperature between 50° C. and boiling point, preferably 60° to 100° C.

When an oxygen-containing gas is not passed through the alkaline dispersion, $CoFe_2O_4$ is not produced and there can not be obtained the magnetic composite iron oxide particles with an excellent magnetic and chemical stability in the present invention.

Also, when the temperature in the alkaline dispersion is below 50° C., $CoFe_2O_4$ is hardly produced and it is difficult to produce the magnetic iron oxide particles with excellent magnetic and chemical stability in the present invention. Since the reaction is carried out in an aqueous solution in the present invention, the upper threshold limit of temperature is boiling point.

The magnetic recording medium according to the present invention can be obtained by applying a coating composition containing a binder resin and the said magnetic composite iron oxide particles of the present invention on a substrate by a conventional method to form a magnetic recording layer on the substrate. The amount of the magnetic composite iron oxide particles in the magnetic recording layer is 60 to 90 wt %, preferably 65 to 85 wt %. The amount of the binder in the magnetic recording layer is 10 to 40 wt % preferably 15 to 35 wt % and the amount of the additives therein is not more than 30 wt %.

The coating composition may contain the usually used additives such as lubricant, abrasive material, antistatic agent, etc.

As the binder resin in the present invention, there can be used vinyl chloride-vinyl acetate copolymer, vinyl chloride-vinyl acetate-maleic acid urethane elastomer, butadiene-acrylonitrile copolymer, polyvinyl butyral, cellulose derivatives such as nitrocellulose, polyester, synthetic rubber resins such as polybutadiene, epoxy resins, polyamide, isocyanate polymers, electon-ray curing-type acrylic urethane resins, etc., and mixtures thereof, which are commonly used in manufacture of magnetic recording media.

As the substrate, there can be used the films of synthetic resins such as polyethylene terephthalates, polyethylenes, polypropylenes, polycarbonates, polyethylene naphthalates, polyamides, polyamide-imides, polyimides, polysulfones, etc., foils or plates of metals such as aluminum, stainless steel, etc., and various papers, which are generally employed in manufacture of magnetic recording media.

The thickness of the magnetic recording layer of the present invention is 1 to 5 μm. The thickness of the magnetic recording medium of the present invention is less than 18 μm.

The magnetic recording media produced by using as the magnetic particles spinel-type composite particles comprising spinel-type $Fe_3O_4$ particles as the core particles and spinel-type $CoFe_2O_4$ outerlayer of the spinel-type composite particles have high coercive force and are low in light transmittance and also excellent in magnetic and chemical stability, owing to high coercive force, black color and excellent magnetic and chemical stability of the spinel-type composite particles of the present invention.

The magnetic iron oxide particles and magnetic recording medium according to the present invention are characterized in that the coercive force is reversible in the temperature range from −35° C. to 150° C.

The magnetic iron oxide particles of the present invention maintain the initial level of coercive force, saturation magnetization and hue, even after allowed to stand under a condition of 60° C. and 90% RH for a long period of time, which shows a very excellent magnetic stability.

Further, the magnetic iron oxide particles according to the present invention maintain the initial level of $Fe^{2+}$ content and show an excellent chemical stability, so that they can well maintain the initial blackness degree.

The magnetic recording medium of the present invention maintain the initial level of coercive force, saturated flux density, and squareness, even after allowed to stand under a condition of 60° C. and 90% RH for a long period of time, which shows a very excellent magnetic stability.

Also, the magnetic recording medium according to the present invention maintain the initial level of light transmittance and show an excellent chemical stability.

Regarding excellent magnetic and chemical stability of the magnetic iron oxide particles and magnetic recording media according to the present invention, it is considered that since the magnetic iron oxide particles used are the spinel-type composite particles comprising spenel-type $Fe_3O_4$ particles as core particles and spinel-type $CoFe_2O_4$ outerlayer of the spinel-type composite particles and are stable against oxidation, and the particle surfaces are substantially free of $Fe^{2+}$, an oxidation of $Fe^{2+}$ in the core particles ($Fe_3O_4$ particles) is prevented or controlled, and consequently there is formed no defect in the crystal lattice, eliminating the possibility of causing immigration of $Fe^{2+}$ and/or $Co^{2+}$.

More specifically, in case where the spinel-type composite particles of the present invention are allowed to stand under an environment of 60° C. and 90% RH for 120 days, the rate of change of a coercive force thereof is within ±10%, preferably within ±8%; the rate of change of a saturation magnetization thereof is within ±10%, preferably within ±8%; the rate of change of an $Fe^{2+}$ content therein is within ±10% preferably within ±8%; and the rate of change of hue (L* value, a* value and b* value) thereof, i.e , L* value is within ±10%, preferably within ±8%, a* value is within ±10% preferably within ±8% and b* value is within ±10% preferably within ±8%.

In case where the magnetic recording medium of the present invention are allowed to stand under an environment of 60° C. and 90% RH for 120 days, the rate of change of a coercive force thereof is within ±10%, preferably within ±8%; the rate of change of a saturated flux density thereof is within ±10° preferably within ±8%; the rate of change of a squareness is within ±10% preferably within ±8%; and the rate of change of a light transmittance thereof is within ±10%, preferably within ±8% .

As described above, the magnetic iron oxide particles according to the present invention have high coercive force and are black in color and highly stable magnetically and chemically.

The magnetic recording media according to the present invention have high coercive force and are low in light transmittance and also excellent in magnetic and chemical stability, so that they are suited for use as high-performance recording media, especially as high-density, high-sensitivity and high-output recording media.

EXAMPLES

The present invention will be explained in more detail in the following Examples and Comparative Examples, it should be recognized, however, that the scope of the present invention is not restricted to these Examples.

The average particle length and the aspect ratio (average particle length/average particle width) shown in the following Examples and Comparative Examples are the average of the values measured from the electron microphotographs, respectively.

The Co content in the magnetic iron oxide particles was measured by ICP-AES (Inductively Coupled Plasma Atomic Emission Spectroscope), and the $Fe^{2+}$ and $Fe^{3+}$ were measured by redox titration method.

The magnetic properties were measured by using a vibration sample magnetometer VSM-3S-15 (mfd. by Toei Kogyo Co., Ltd.) applying an external magnetic field of up to 10 kOe.

The reversibility of coercive force before and after heating of the magnetic particles was determined in the following way. Each sample for measurement in the vibration sample magnetometer was placed in a quartz protective tube, and after replacing the interior of the said protective tube with a nitrogen atmosphere, the sample was heated up from 25° C. to 150° C. and then cooled down to room temperature (25° C.), and in the course of this heating process, the said sample was kept at each of the preset temperatures 50° C., 70° C., 90° C., 110° C., 130° C. and 150° C. for one minute at each temperature, and the values of coercive force measured after this heat-treatment were plotted in a graph showing the relationship between temperature and coercive force. In the graphs, circular (O) mark indicates the value of coercive force at each temperature in the temperature-rising step, and triangular (Δ) mark indicates the value of coercive force at each temperature in the temperature-lowering step. The more approximating and overlapping of O mark and Δ mark indicates higher reversibility of coercive force for heat-treatment, and the more separating of O mark and Δ mark indicates irreversibility of coercive force for heat-treatment.

The initial $Fe^{2+}$ content in the magnetic iron oxide particles was shown by the measurement value of the magnetic iron oxide particles obtained after drying at a temperature of 60° C. for 24 hours in high-purity nitrogen. The change of $Fe^{2+}$ content with the passage of time was shown by the measurement value of the iron oxide particles after allowed to stand under a condition of 60° C. and 90% RH in the air.

The change of hue with the passage of time was shown by the measurement values of L* value (lightness), a* value and b* value. L* value (lightness), a* value and b* value were represented by the respective values of the samples measured in the Lab space of Hunter by using a Multi-Light-Source Spectrocolorimeter (MSC-IS-2D, mfd. by Suga Testing Machines Mfd. Co., Ltd.) in accordance with the (L*, a* and b*) uniform sensory color space of Commission Internationale de l′ Eclairage CIE 1976. The sample for measurement of hue was prepared by kneading 0.5 g of magnetic iron oxide particles and 0.5 cc of castor oil into a paste by a Huber-type muller, adding 4.5 g of clear lacquer to the said paste and kneading them to form a coating material, and applying this coating material on a cast coated paper by a 6-mil applicator.

The light transmittance was measured at λ=900 nm by using a photoelectric spectrophotometer UV-2100 (mfd. by Shimadzu Corp.). Light transmittance is standardized to not more than 1% under JIS X 6121 for the magnetic recording medium.

PRODUCTION OF CORE PARTICLES

Preparation of Core Particles A

To 22 litres of an aqueous 1.8 N-NaOH solution heated to 90° C. 10 litres of an aqueous 1 72M-ferrous sulfate solution was added while blowing air through the solution at a rate of 100 l/min to carry out the reaction for 2 hours, thereby obtaining a suspension containing a black precipitate. After completion of the reaction, a part of slurry was sampled out from the reaction solution and the obtained properties of the black particles were measured. As a result of redox titration of the obtained black particles, they were identified as $Fe_3O_4$. The average particle size was 0.15 μm. As for the magnetic properties of these particles, the coercive force was 150 Oe and the saturation magnetization was 85.2 emu/g.

Preparation of Core Particles B 1,300 g of acicular hematite particles having an average particle length of 0.20 μm and an average particle width of 0.03 μm were charged into a 10-litre retort for reducing and $H_2$ gas was passed into the rotating retort at a rate of 2 litre/min to reduce hematite at a temperature of 400° C., thereby obtaining acicular magnetite particles. A part of the obtained black particles was sampled out and as a result of the redox titration, the black particles were identified as $Fe_3O_4$ and had an average particle length of 0.20 μm, an average particle width of 0.03 μm, a coercive force of 420 Oe and a saturation magnetization of 81.2 emu/g.

Preparation of Core Particles C 1,300 g of acicular hematite particles having an average particle length of 0.30 μm and an average particle width of 0.042 μm were charged into a 10-litre retort for reducing and $H_2$ gas was passed into the rotating retort at a rate of 2 litre/min to reduce hematite at a temperature of 400° C., thereby obtaining acicular magnetite particles. A part of the obtained black particles were sampled out and as a result of the redox titration, the black particles were identified as $Fe_3O_4$. Also, these particles had an average particle length of 0.30 μm, an average particle width of 0.042 μm, a coercive force of 430 Oe and a saturation magnetization of 82.3 emu/g.

EXAMPLE 1

By using as reaction vessel a 50-litre bubble tower provided with a stirrer, 3,033 litres of an aqueous 18 N-NaOH solution was added to 32 litres of an aqueous suspension which had dispersed therein 1,294 g of granular $Fe_3O_4$ particles (average particle size: 0.15 μm; coercive force: 150 Oe; saturation magnetization: 85.2 emu/g) obtained in the Preparation of Core Particles A , while passing air through the suspension at a rate of 100 litre/min to prepare an alkaline suspension with pH 14.1. This resultant alkaline suspension was heated to 90° C. and to this suspension was added 10 litres of a mixed solution of 1.68M-$FeSO_4$ and 0.840 M-$CoSO_4$ (2 moles of $Fe^{2+}$ based on one mole of $Co^{2+}$), while controlling the concentrations of $Co^{2+}$ and $Fe^{2+}$, so that the total concentration of $Co^{2+}$ and $Fe^{2+}$ became 0.05M, and the composite particle synthesis reaction was carried out for 60 minutes. The reaction product was filtered, washed with water and dried in the usual way to obtain the black particles.

The thus obtained black particles had an average particle size of 0.21 μm, a coercive force Hc of 840 Oe and a saturation magnetization σs of 75.5 emu/g. The $Fe^{2+}$ content was 13.2 wt %. The L* value was 22.0; a* value was −0.07; and b* value was −1.15.

Figure 1:
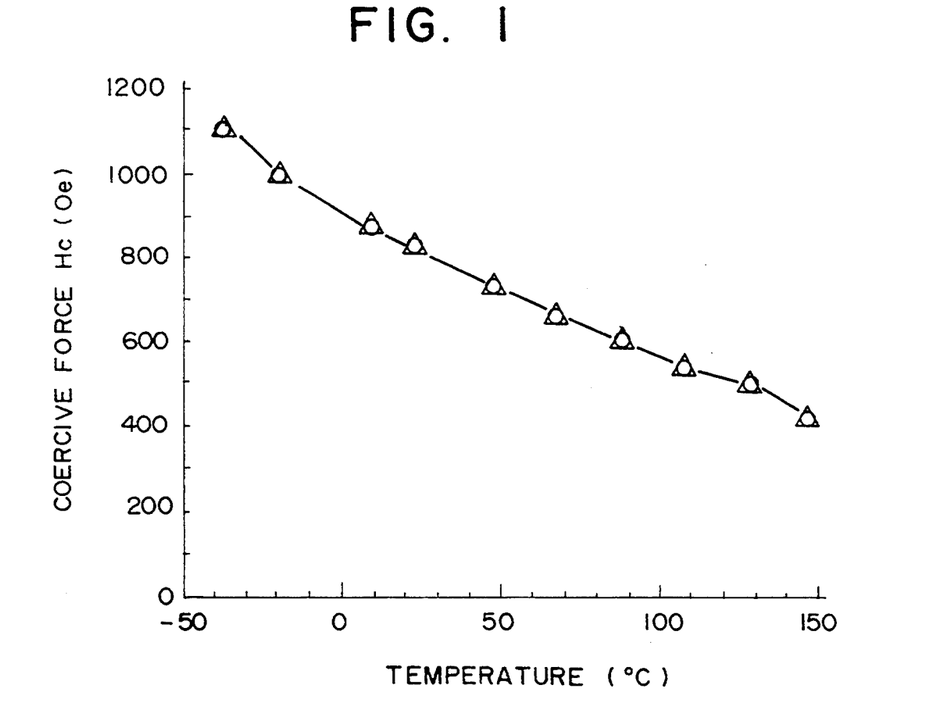
FIG. 1 shows a reversibility of coercive force, in the temperature range from −35° C. to 150° C., of the spinel-type composite particles obtained in Example 1.

As seen from the FIG. 1, the coercive force of the obtained particles was reversible in the temperature range from −35° C. to 150° C. Also, as shown from Table 1, there were admitted almost no change of the coercive force and saturation magnetization of the obtained particles under an environment of 60° C. and 90% RH, indicating excellent magnetic stability of the particles.

In the FIG. 1, along with the reversibility of coercive force when the sample was heated up from 25° C. to 150° C. and again cooled down to room temperature, there is also shown the reversibility of coercive force obtained from the measurement after retaining the sample at each of the temperatures 10° C., −20° C. and −35° C. for one minute at each temperature, in the process of cooling the sample to −35° C. and again heating to 25° C.

As seen from Tables 1 and 2, $Fe^{2+}$ content and there was also admitted almost no change of the hue under an environment of 60° C. and 90% RH, indicating that the particles are chemically stable.

In the X-ray diffraction pattern of these black particles, there was admitted only peaks indicating the spinel-type crystal structure, and as a result of the compositional analysis of $Co^{2+}$, $Fe^{2+}$ and $Fe^{3+}$ by the following method, it was confirmed that the composition of the particle surface was $CoFe_2O_4$ and that of the core particle was $Fe_3O_4$ (The coating amount of $CoFe_2O_4$ was 60.0 wt % based on the produced spinel-type composite particles). The composition of the particles was analyzed by suspending 10 g of the obtained black particles in 100 ml of water, putting the suspension into a reaction vessel, heating the resultant suspension to 60° C. adding 200 ml of an aqueous 1 N-HCl solution to the suspension with stirring, and measuring the amounts of $Co^{2+}$ $Fe^{2+}$ and $Fe^{3+}$ dissolved in the resultant solution. In detail, there were prepared six samples for measurement. One sample was taken out upon passage of 1 minute (t=1) , 5 minutes (t=5) , 10 minutes (t=10) , 30 minutes(t=30), 60 minutes(t=60) and 120 minutes(t=120) after addition of HCl, when the moment of addition of HCl was represented by t=0, and the amounts of $Co^{2+}$ $Fe^{2+}$ and $Fe^{3+}$ in the filtrate obtained by filtering the black particles were analyzed. From the solution of t=1, no $Fe^{2+}$ was detected and the ratio of $Co^{2+}$ to $Fe^{3+}$ was 1:2. Thus, it was confirmed that the composition of the surface of the black particle was $CoFe_2O_4$. In another analysis, the black particles filtered out from the suspension of t=120 were washed with pure water and, after removing the water-soluble salts, the compositional analysis of the black particles was conducted. As a result, no $Co^{2+}$ was detected and the ratio of $Fe^{3+}$ to $Fe^{2+}$ was 2:1. It was confirmed that the composition of the core portion of the black particle was $Fe_3O_4$.

EXAMPLE 2

A composite particle was synthesized in the same procedure as Example 1 except that there was used 2.767 litres of an aqueous 18 N-NaOH solution instead of 3.033 litres to prepare an alkaline suspension with pH 14.1; that the concentration of $COSO_4$ was adjusted to 0.60M instead of 0.840M (2.8 moles of $Fe^{2+}$ based on one mole of $Co^{2+}$); that the air blowing rate was changed to 80 litre/min; that the alkaline dispersion was heated to 95° C.; and that the concentrations of $Co^{2+}$ and $Fe^{2+}$ were controlled so that the total concentration of $Co^{2+}$ and $Fe^{2+}$ became 0.03M.

The obtained black particles had an average particle size of 0.19 μm; a coercive force Hc of 484 Oe; a saturation magnetization σs of 86.2 emu/g; an $Fe^{2+}$ content of 15.9 wt %; L* value of 21.5; a* value of −0.04; and b* value of −1.07.

Figure 2:
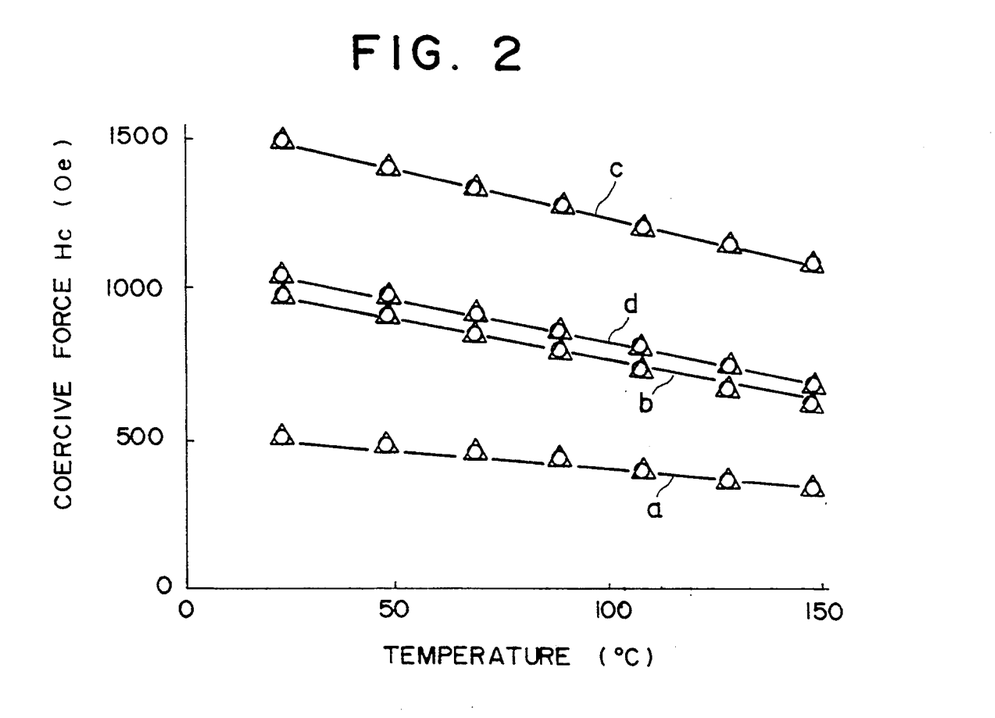
FIG. 2 shows a reversibility of coercive force, in the temperature range from 25° C. to 150° C., of the spinel-type composite particles obtained in Examples 2 to 5. In the FIG. 2, lines "a" to "d" designate the spinel-type composite particles obtained in Examples 2 to 5, respectively.

As seen from line "a" in the FIG. 2, the coercive force after heating was the same as that before heating. Also, as shown from Table 1, there were admitted almost no change of the coercive force and saturation magnetization under an environment of 60° C. and 90% RH, indicating an excellent magnetic stability of the particles. Further, as shown from Tables 1 and 2, there were admitted almost no change of the $Fe^{2+}$ content and the hue under an environment of 60° C. and 90% RH, indicating an excellent chemical stability of the particles. X-ray diffraction of these black particles showed only peaks indicating spinel-type crystal structure, and as the results of compositional analysis conducted in the same way as Example 1, it was confirmed that the composition of the particle surface was $CoFe_2O_4$ and that of the core portion was $Fe_3O_4$ (The coating amount of $CoFe_2O_4$ was 57.6 wt % based on the produced spinel-type composite particles).

EXAMPLE 3

A composite particle was synthesized in the same way as Example 1 except that 1,200 g of acicular $Fe_3O_4$ (average particle length: 0.20 μm; average particle width: 0.03 μm; coercive force Hc: 420 Oe; saturation magnetization: 81.2 emu/g) obtained in the Preparation of the Core Particles B was used instead of granular $Fe_3O_4$ as core particles; that 0.827 litres of an aqueous 18 N-NaOH solution was used instead of 2.715 lit res to form an alkaline suspension with pH 13.6; that the concentration of $COSO_4$ was adjusted to 0.178M instead of 0.840M and the concentration of $FeSO_4$ was adjusted to 0.356M instead of 1.68M (2 moles of $Fe^{2+}$ based on one mole of $Co^{2+}$); and that the concentrations of $Co^{2+}$ and $Fe^{2+}$ were controlled so that the total concentration of $Co^{2+}$ and $Fe^{2+}$ became 0.01M.

The obtained black particles had an average particle length of 0.21 μm; an average particle width of 0.032 μm; a coercive force Hc of 967 Oe; a saturation magnetization of 77.1 emu/g; an $Fe^{2+}$ content of 15.5 wt %; L* value of 23.0; a* value of 0.11; and b* value of −0.84.

As shown by line "b" in the FIG. 2, the coercive force after heating was same as that before heating, and as shown from Table 1, there were admitted almost no change of the coercive force and saturation magnetization under an environment of 60° C. and 90% RH, indicating an excellent magnetic stability of the particles. Also, as shown in Tables 1 and 2, there were admitted substantially no change of the $Fe^{2+}$ content and the hue under an environment of 60° C. and 90° RH, which indicates that these particles are chemically stable. In the X-ray diffraction pattern of the obtained black particles, there was observed only peaks indicating spinel-type crystal structure. Also, as the results of compositional analysis conducted in the manner of Example 1, it was confirmed that the composition of the particle surface was $CoFe_2O_4$ and that of the core portion was $Fe_3O_4$ (The coating amount of $CoFe_2O_4$ was 25.5 wt % based on the produced spinel-type composite particles).

EXAMPLE 4

A composite particle was synthesized in the same procedure of Example 3 except that there was used 1.420 litres of an aqueous 18 N-NaOH solution instead of 0.827 litres to prepare an alkaline suspension with pH 13.8; that the concentration of $COSO_4$ was-adjusted to 0.356M instead of 0.178M and the concentration of $FeSO_4$ was adjusted to 0.712 M instead of 0.356M (2 moles of $Fe^{2+}$ based on one mole of $Co^{2+}$); that the air blowing rate was set at 120 litre/min; that the alkaline dispersion was heated to 95° C.; and that the concentrations of $Co^{2+}$ and $Fe^{2+}$ were controlled so that the total concentration of $Co^{2+}$ and $Fe^{2+}$ became 0.15M.

The obtained black particles had an average particle length of 0.23 μm; an average particle width of 0.033 μm; a coercive force of 1,467 Oe; a saturation magnetization of 73.4 emu/g; an $Fe^{2+}$ content of 12.1 wt %; L* value of 21.2; a* value Of 0.06; and b* value of −0.96.

As shown by line "c" in the FIG. 2, coercive force before and after heating was identical, and as shown from Table 1, there were admitted almost no change of the coercive force and saturation magnetization under an environment of 60° C. and 90% RH, indicating an excellent magnetic stability of the particles. Also, as shown in Tables 1 and 2, there was admitted almost no change of the $Fe^{2+}$ content and the hue under an environment of 60° C. and 90% RH, indicating an chemical stability of the particles. The X-ray diffraction pattern of the obtained black particles showed only peaks indicating spinel-type crystal structure. Also, as the results of compositional analysis in accordance with Example 1, it was confirmed that the composition of the particle surface was $CoFe_2O_4$ and that of the core portion was $Fe_3O_4$ (The coating amount of $CoFe_2O_4$ was 40.7 wt % based on the produced spinel-type composite particles).

EXAMPLE 5

A composite particles were synthesized in the same procedure of Example 3 except that acicular $Fe_3O_4$ particles (average particle length: 0.30 μm; average particle width: 0.042 μm; coercive force Hc: 430 Oe; saturation magnetization: 82.3 emu/g) obtained in the Preparation of the Core Particles C were used as core particles; that 1.120 litres of an aqueous 18 N-NaOH solution was used instead of 0.827 litres to prepare an alkaline suspension with pH 13.7; that the concentration of $COSO_4$ was adjusted to 0.267M instead of 0.178M and the concentration of $FeSO_4$ was adjusted to 0.534M instead of 0.356M (2 moles of $Fe^{2+}$ based on one mole of $Co^{2+}$); that the air blowing rate was set at 80 litre/min; that the alkaline dispersion was heated to 90° C.; and that the concentrations of $Co^{2+}$ and $Fe^{2+}$ were controlled so that the total concentration of $Co^{2+}$ and $Fe^{2+}$ became 0.10 M.

The obtained black particles had an average particle length of 0.32 μm; an average particle width of 0.045 μm; a coercive force of 1,020 Oe; a saturation magnetization of 79.1 emu/g; an $Fe^{2+}$ content of 16.0 wt %; L* value of 18.8; a* value of 0.01; and b* value of −1.12.

As shown by line "d" in the FIG. 2, the coercive force before and after heating was identical, and as shown from Table 1, there were admitted almost no change of the coercive force and saturation magnetization under an environment of 60° C. and 90% RH, indicating an excellent magnetic stability of the particles. Also, as shown in Tables 1 and 2, almost no change was observed in the $Fe^{2+}$ content and the hue under an environment of 60° C. and 90% RH, indicating that the particles are chemically stable. On the X-ray diffraction pattern of the said black particles, there were seen only peaks indicating spinel-type crystal structure, and as the results of compositional analysis in the same way as Example 1, it was confirmed that the composition of the particle surface was $CoFe_2O_4$ and that of the core portion was $Fe_3O_4$ (The coating amount of $CoFe_2O_4$ was 34.0 wt % based on the produced spinel-type composite particles).

COMPARATIVE EXAMPLE 1

A composite particle synthesis reaction was carried out for 2 hours in the same procedure as Example 1 except that 1.833 litres of an aqueous 18-N NaOH solution was used instead of 3.033 litres to prepare an alkaline dispersion of pH 13.9; that 10 litres of a mixed solution of 1.2M-$FeSO_4$ and 0.24M-$CoSO_4$ (5 moles of $Fe^{2+}$ based on one mole of $Co^{2+}$) was used; that the alkaline suspension was heated to 80° C.; that the air blowing rate was set at 120 litre/min; and that the mixed solution of $FeSO_4$ and $CoSO_4$ was added by controlling the concentrations of $Co^{2+}$ and $Fe^{2+}$ so that the total concentration of $Co^{2+}$ and $Fe^{2+}$ became 0.03M. The produced particles were filtered, washed with water and dried in the known ways to obtain the black particles.

These obtained black particles had an average particle size of 0.20 μm; a saturation magnetization $\sigma s$ of 85.2 emu/g; a coercive force Hc of 650 Oe; an $Fe^{2+}$ content of 12.2 wt %; L* value of 19.39; a* value of 0.45; and b* value of −1.02.

Figure 3:
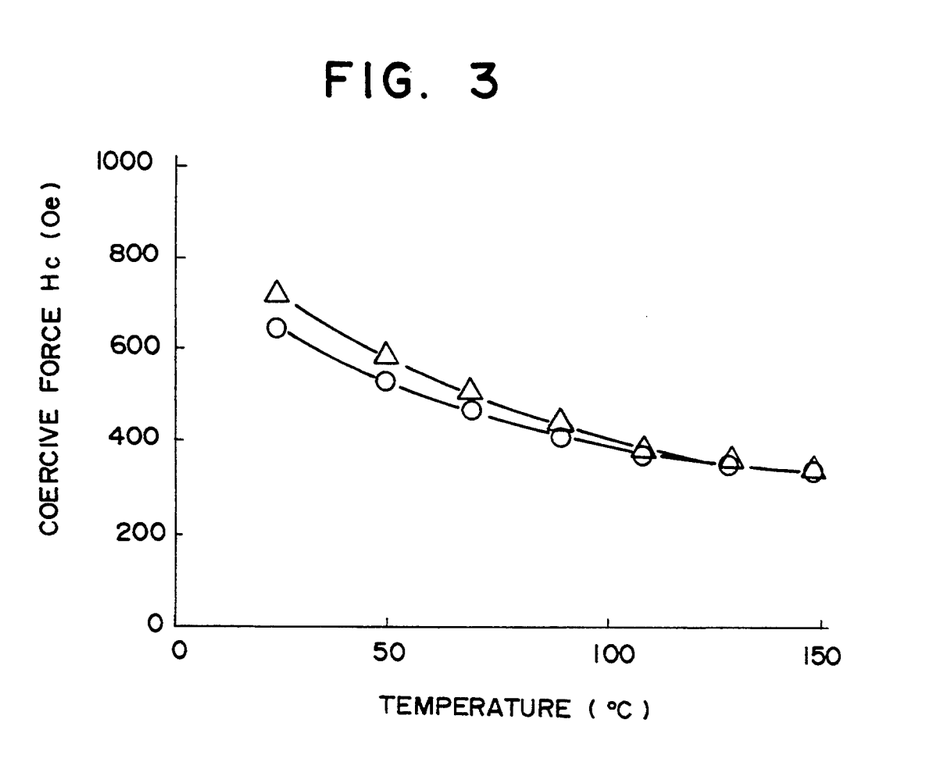
FIG. 3 shows a hysteresis of coercive force, in the temperature range from 25° C. to 150° C., of the spinel-type composite particles obtained in Comparative Example 1.

As seen from the FIG. 3, the coercive force before and after heating was not identical, and as seen from Table 1, the coercive force and saturation magnetization varied greatly under an environment of 60° C. and 90% RH, indicating that these particles are magnetically unstable. Also, as shown in Table 1, the $Fe^{2+}$ content was reduced markedly under the said environment, and consequently, the hue was also varied greatly as shown in Table 2. This is indicative of chemical unstability of the particles.

X-ray diffraction of these black particles showed that they had a spinel-type crystal structure, and in composition analyzed in the same way as Example 1, $Co^{2+}$, $Fe^{2+}$ and $Fe^{3+}$ were detected from the solution of t=1. These facts indicate that the surface of the said black particle is a spinel material having $Co^{2+}$, $Fe^{2+}$ and $Fe^{3+}$, specifically a composition represented by the formula: $Co_xFe_{1-x}Fe_2O_3$ The coating amount of $CoFe_2O_4$ in the magnetic iron oxide particles obtained in Examples 1–5 and Comparative Example 1 are shown in Table 5.

TABLE 5

|  | $CoFe_2O_4$ | Intermediate layer |
|---|---|---|
| Example 1 | 60.0 wt % | 0 |
| Example 2 | 42.8 wt % | 14.8 |
| Example 3 | 25.5 wt % | 0 |
| Example 4 | 40.7 wt % | 0 |
| Example 5 | 34.0 wt % | 0 |
| Comparative Example 1 | 7.4 wt % | 35.1 |

COMPARATIVE EXAMPLE 2

A synthesis was carried out in the same procedure as Example 1 except that 3.344 litres of an aqueous 18 N-NaOH solution was used instead of 3.033 litres to prepare an alkaline dispersion with pH 14.2; that 10 litres of a mixed solution of 1.68M $FeSO_4$ and 1.12M $CoSO_4$ (1.5 moles of $Fe^{2+}$ based on one mole of $Co^{2+}$) was used; that the alkaline suspension was heated to 80° C.; that the air blowing rate was set at 100 l/min; and that the mixed solution of $FeSO_4$ and $CoSO_4$ was added by controlling the concentrations of $Co^{2+}$ and $Fe^{2+}$ so that the total concentration of $Co^{2+}$ and $Fe^{2+}$ became 0.15M. The mother liquor of reaction was sampled at the points of 2 hours, 4 hours and 8 hours after starting the air blowing, and the product was observed with an electron microscope. The presence of the hexagonal plate-like particles was confirmed in each sample, and as the result of the electron ray diffraction, the composition of these hexagonal plate-like particles were Co-$(OH)_2$.

COMPARATIVE EXAMPLE 3

The same synthesis as in Example 1 was carried out except that the mixed solution was added by controlling the concentrations of $Co^{2+}$ and $Fe^{2+}$ so that the total concentration of $Co^{2+}$ and $Fe^{2+}$ became 0.6M. The obtained particles were washed with water, dried and then subjected to electron microscopical observation. There were observed the particles smaller than the $Fe_3O_4$ particles as the core particles and the particles which have grown up largely, and it was seen that the individual particles were mingled with each other.

COMPARATIVE EXAMPLE 4

The same synthesis as in Example 1 was carried out except that the mixed solution was added by controlling the concentrations of $Co^{2+}$ and $Fe^{2+}$ so that the total concentration of $Co^{2+}$ and $Fe^{2+}$ became 0.001M. The obtained particles were washed with water, dried and subjected to electron microscopical observation. There were observed the particles smaller than the $Fe_3O_4$ particles as the core particles and the particles which have grown up largely, and it was seen that the individual particles were mingled with each other.

EXAMPLE 6

100 parts by weight of the iron oxide particles obtained in each of Examples 1 to 5 and Comparative Example 1, 14 parts by weight of VAGH (vinyl chloride-vinyl acetate-vinyl alcohol copolymer, produced by U.C.C. Corp.), 1 parts by weight of myristic acid, 30 parts by weight of toluene, 30 parts by weight of methyl ethyl ketone and 1 part by weight of $Al_2O_3$ powder were mixed and kneaded by a kneader for 90 minutes, and the kneaded product was diluted by adding 45 parts by weight of toluene and 45 parts by weight of methyl ethyl ketone and subjected to a sand grinder for mixing and dispersion for 3 hours.

To the resulting dispersion was added 140 parts by weight of a methyl ethyl ketone solution containing 14 parts by weight (solid) of a polyurethane resin (Nipporan 2304, produced by Nippon Polyurethane Kogyo K.K.), and they were mixed for 30 minutes and then filtered. The obtained filtrate was mixed with 3 parts by weight of Collonate L (trifunctional low-molecular weight isocyanate compound, produced by Nippon Polyurethane Kogyo Co., Ltd.), thereby obtaining six samples of magnetic coating material.

Each of the magnetic coating material was applied on a polyester film as the substrate of 14 μm in thickness and then dried to form a magnetic layer of 4 μm in thickness on the film, and then the resultant film was cut to a width of ½ inch to form a magnetic tape.

The thus obtained magnetic tape had a coercive force of 912 Oe; a saturated flux density Bm of 1,452 Gauss; a squareness ratio (Br/Bm) of 0.702. The light transmittance of the obtained tape was as low as 0.32.

Figure 4:
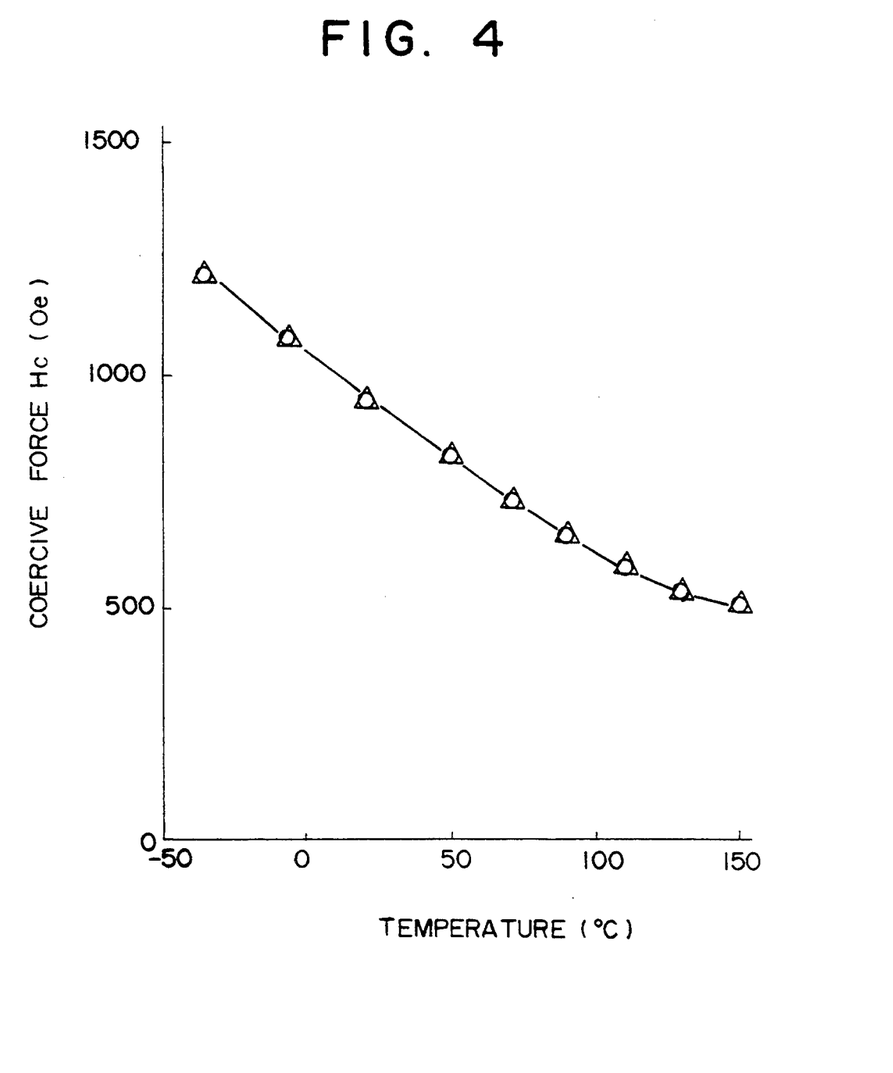
FIG. 4 shows a reversibility of coercive force, in the temperature range from −35° C. to 150° C., of the magnetic recording medium obtained in Example 6.

As seen from the FIG. 4, the coercive force in the temperature range from −35° C. to 150° C. was reversible, and as shown from Tables 3 and 4, there were admitted almost no change of the coercive force, saturated flux density and squareness ratio under an environment of 60° C. and 90% RH, indicating an excellent magnetic stability of this magnetic tape. Also, as shown in Table 4, there was admitted almost no change of the light transmittance under the said environment, and it was confirmed that this magnetic tape has an excellent chemical stability, too.

In the FIG. 4, along with the coercive force when the tape was heated from 25° C. to 150° C. and then cooled down to room temperature, there is also shown the coercive force determined after retaining the tape for one minute at each of the temperatures 10° C. −20° C. and −35° C. in the process of cooling to −35° C. and again heating to 25° C.

EXAMPLES 7-10 AND COMPARATIVE EXAMPLE 5

Magnetic tapes were produced in the same procedure as Example 6 except that the kind of the magnetic particles used was changed.

Figure 5:
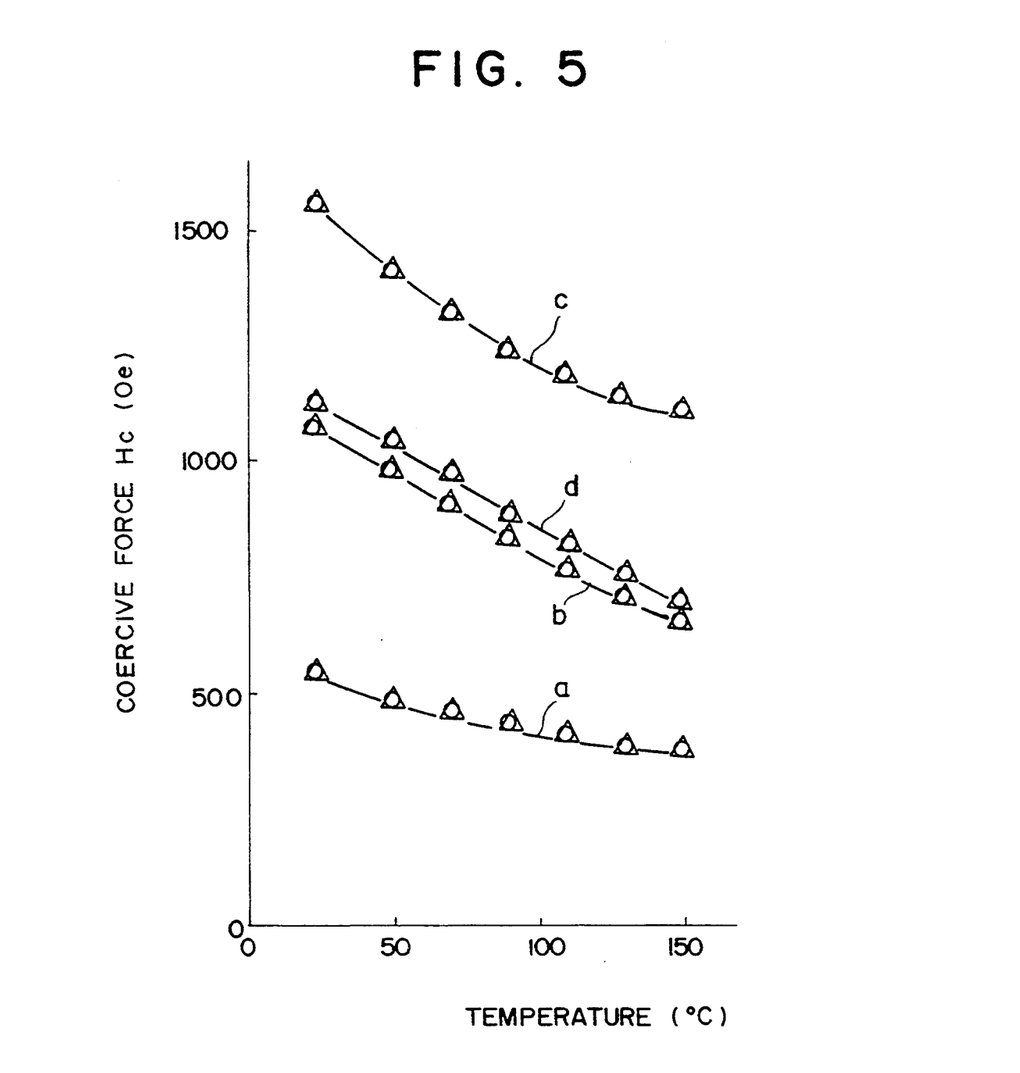
FIG. 5 show a reversibility of coercive force, in the temperature range from 25° C. to 150° C., of the magnetic recording media obtained in Examples 7 to 10. In the FIG. 5, lines "a" to "d" represent the magnetic recording media obtained in Examples 7 to 10, respectively.
Figure 6:
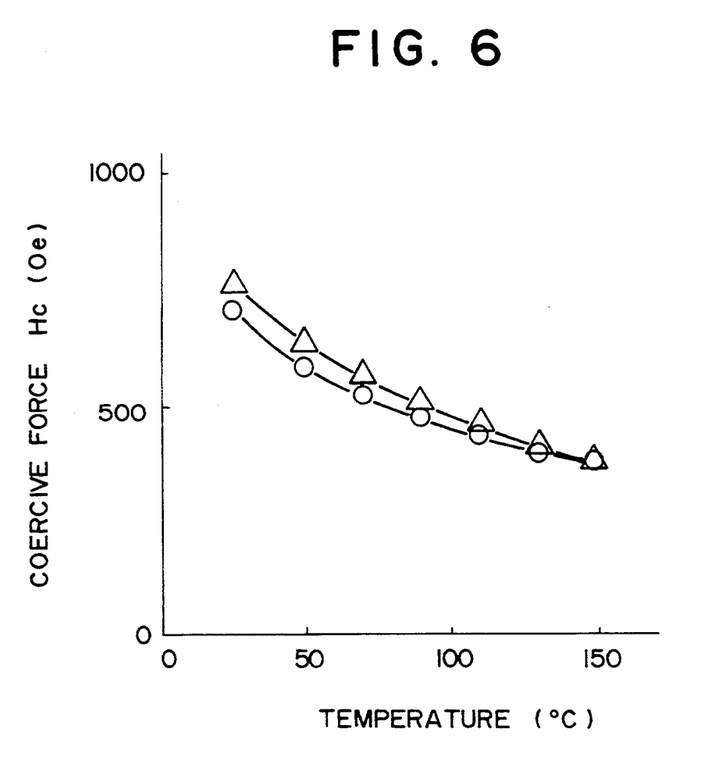
FIG. 6 shows a hysteresis of coercive force, in the temperature range from 25° C. to 150° C., of the magnetic recording medium obtained in Comparative Example 5.

The properties of the obtained magnetic tapes are shown in Tables 3 and 4 and FIGS. 5 and 6.

In the FIG. 5, lines "a" to "d" represent the magnetic recording media obtained in Examples 7 to 10, respectively. The FIG. 6 shows the properties of the magnetic recording medium obtained in Comparative Example 5.

The changes with the passage of time of the coercive force Hc (Oe), the saturated flux density Bm (Gauss), the squareness and the light transmittance of the obtained magnetic tapes are shown in Tables 3 and 4.

TABLE 1

| Kind of magnetic iron oxide particles | Change with the passage of time under environment of 60° C. and 90% RH | | | | | | | | | | | | | | |
|---|---|---|---|---|---|---|---|---|---|---|---|---|---|---|---|
| | Coercive force Hc (Oe) | | | | | Saturation magnetization $\sigma s$ (emu/g) | | | | | $Fe^{2+}$ (wt %) | | | | |
| | First day | 7th day | 15th day | 30th day | 120th day | First day | 7th day | 15th day | 30th day | 120th day | First day | 7th day | 15th day | 30th day | 120th day |
| Example 1 | 840 | 835 | 841 | 832 | 835 | 78.5 | 78.9 | 78.3 | 78.3 | 78.4 | 13.2 | 13.0 | 13.3 | 13.1 | 13.0 |
| Example 2 | 484 | 490 | 485 | 480 | 487 | 85.6 | 85.4 | 85.4 | 85.4 | 85.4 | 15.9 | 15.8 | 15.9 | 15.7 | 15.6 |
| Example 3 | 967 | 964 | 968 | 960 | 970 | 77.1 | 77.0 | 76.8 | 76.8 | 76.8 | 15.5 | 15.3 | 15.3 | 15.3 | 15.3 |
| Example 4 | 1467 | 1470 | 1466 | 1460 | 1468 | 73.4 | 73.2 | 73.2 | 73.3 | 73.2 | 12.1 | 12.0 | 12.0 | 12.0 | 11.9 |
| Example 5 | 1020 | 1018 | 1021 | 1015 | 1022 | 79.1 | 78.8 | 78.7 | 78.8 | 78.7 | 16.0 | 15.9 | 15.9 | 16.0 | 15.8 |
| Comparative example 1 | 650 | 752 | 755 | 770 | 782 | 85.2 | 84.3 | 83.9 | 83.7 | 83.6 | 12.2 | 10.4 | 10.0 | 9.8 | 9.7 |

TABLE 2

| Kind of magnetic iron oxide particles | | Change of hue with the passage of time under environment of 60° C. and 90% RH | | | | |
|---|---|---|---|---|---|---|
| | | First day | 7th day | 15th day | 30th day | 120th day |
| Example 1 | L* | 22.0 | 22.1 | 22.0 | 22.2 | 22.0 |
| | a* | −0.07 | −0.07 | −0.08 | −0.07 | −0.08 |
| | b* | −1.15 | −1.13 | −1.14 | −1.15 | −1.14 |
| Example 2 | L* | 21.5 | 21.2 | 21.6 | 21.3 | 21.0 |
| | a* | −0.04 | −0.05 | −0.04 | −0.06 | −0.04 |
| | b* | −1.07 | −1.09 | −1.08 | −1.10 | −1.08 |
| Example 3 | L* | 23.0 | 22.8 | 22.9 | 22.7 | 22.9 |
| | a* | 0.11 | 0.12 | 0.11 | 0.10 | 0.14 |
| | b* | −0.84 | −0.85 | −0.85 | −0.80 | −0.85 |
| Example 4 | L* | 21.2 | 21.1 | 21.3 | 21.0 | 21.5 |
| | a* | 0.06 | 0.06 | 0.08 | 0.10 | 0.08 |
| | b* | −0.96 | −0.98 | −0.95 | −0.92 | −0.96 |
| Example 5 | L* | 18.8 | 18.9 | 18.7 | 18.5 | 19.1 |
| | a* | 0.01 | 0.03 | 0.03 | 0.02 | 0.02 |
| | b* | −1.12 | −1.09 | −1.10 | −1.08 | −1.12 |
| Comparative example 1 | L* | 19.39 | 19.52 | −19.68 | 20.10 | 20.22 |
| | a* | 0.45 | 0.62 | 0.71 | 0.75 | 0.76 |
| | b* | −1.02 | −0.92 | 0.88 | 0.10 | 0.11 |

TABLE 3

| Kind of magnetic recording medium | Kind of magnetic iron oxide particles | Change with the passage of time under environment of 60° C. and 90% RH | | | | | | | | | |
|---|---|---|---|---|---|---|---|---|---|---|---|
| | | Coercive force Hc (Oe) | | | | | Saturated flux density Bm (Gauss) | | | | |
| | | First day | 7th day | 15th day | 30th day | 120th day | First day | 7th day | 15th day | 30th day | 120th day |
| Example 6 | Example 1 | 912 | 910 | 906 | 906 | 907 | 1452 | 1450 | 1449 | 1450 | 1448 |
| Example 7 | Example 2 | 535 | 533 | 533 | 532 | 533 | 1471 | 1465 | 1464 | 1463 | 1463 |
| Example 8 | Example 3 | 1067 | 1064 | 1065 | 1064 | 1063 | 1386 | 1384 | 1385 | 1383 | 1380 |
| Example 9 | Example 4 | 1545 | 1542 | 1543 | 1541 | 1640 | 1483 | 1478 | 1478 | 1473 | 1474 |
| Example 10 | Example 5 | 1136 | 1132 | 1133 | 1131 | 1130 | 1312 | 1313 | 1310 | 1313 | 1310 |
| Comparative example 5 | Comparative example 1 | 723 | 725 | 745 | 758 | 759 | 1358 | 1355 | 1354 | 1350 | 1353 |

TABLE 4

| Kind of magnetic recording medium | Kind of magnetic iron oxide particles | Change with the passage of time under environment of 60° C. and 90% RH | | | | | | | | | |
|---|---|---|---|---|---|---|---|---|---|---|---|
| | | Coercive force Hc (Oe) | | | | | Saturated flux density Bm (Gauss) | | | | |
| | | First day | 7th day | 15th day | 30th day | 120th day | First day | 7th day | 15th day | 30th day | 120th day |
| Example 6 | Example 1 | 0.702 | 0.702 | 0.703 | 0.702 | 0.701 | 0.32 | 0.33 | 0.34 | 0.33 | 0.34 |
| Example 7 | Example 2 | 0.648 | 0.647 | 0.648 | 0.647 | 0.646 | 0.28 | 0.29 | 0.28 | 0.29 | 0.30 |
| Example 8 | Example 3 | 0.801 | 0.802 | 0.803 | 0.802 | 0.801 | 0.45 | 0.46 | 0.46 | 0.47 | 0.48 |
| Example 9 | Example 4 | 0.782 | 0.780 | 0.780 | 0.781 | 0.780 | 0.35 | 0.36 | 0.37 | 0.37 | 0.37 |
| Example 10 | Example 5 | 0.788 | 0.789 | 0.789 | 0.788 | 0.787 | 0.49 | 0.52 | 0.53 | 0.53 | 0.53 |
| Comparative example 5 | Comparative example 1 | 0.585 | 0.596 | 0.608 | 0.611 | 0.615 | 0.45 | 0.73 | 0.87 | 0.94 | 1.25 |

What is claimed is:

1. A magnetic composite iron oxide particle comprising a core particle composed of $Fe_3O_4$ having a spinel structure and an outer layer composed of $CoFe_2O_4$ having a spinel structure, wherein crystals of the $CoFe_2O_4$ having a spinel structure are epitaxially grown on crystal planes of the $FesO_4$ having a spinel structure.

2. The magnetic composite iron oxide particle according to claim 1, wherein said core particles are spherical, hexahedral or octahedral particles having an average particle size of 0.01 to 0.5/an.

3. The magnetic composite iron oxide particle according to claim 1, wherein said core particles are acicular or spindle shaped particles having an average particle length of 0.01 to 0.5 μm and an average particle length/average particle width ratio of not less than 2.

4. The magnetic composite iron oxide particle according to claim 1, wherein the amount of $CoFe_2O_4$ is 10 to 80 wt % based on the composite iron oxide particle.

5. The magnetic composite iron oxide particle according to claim 1, having a coercive force of 100 to 3,000 Oe.

6. The magnetic composite iron oxide particles according to claim 1, wherein the change of saturation magnetization is within +10% based on the initial value thereof, the change of coercive force is within +10% based on the initial value thereof, and the change of $Fe^{2+}$ content in the particles is within ±10% based on the initial value thereof, after standing for 120 days in an environment of 60° C. and 90% relative humidity.

7. The magnetic composite iron oxide particles according to claim 1, wherein the change of L* value of said magnetic composite iron oxide particle is within +10% based on the initial value thereof, the change of a* value of said magnetic composite iron oxide particle is within +10% based on the initial value thereof, the change of b* value of said magnetic composite iron oxide particle is within +10% based on the initial value thereof, after standing for 120 days in an environment of 60° C. and 90% relative humidity.

8. A magnetic composite iron oxide particle comprising a core particle composed of $Fe_3O_4$ having a spinel structure; an intermediate layer composed of an oxide containing Fe and Co with a Fe/Co atomic ratio of more than 2 having a spinel structure and disposed on the surface of the core particle; and an outer layer composed of $CoFe_2O_4$ having a spinel structure, wherein crystals of the oxide containing Fe and Co having a spinel structure forming the intermediate layer are epitaxially grown on crystal planes on the $FesO_4$ having a spinel structure and crystals of the $CoFe_2O_4$ having a spinel structure forming the outer layer are epitaxially grown thereon.

9. The magnetic composite iron oxide particle according to claim 8, wherein the amount of Fe and Co-containing oxide having a spinel structure is not more than 26 wt % based on the composite iron oxide particle.

10. A magnetic composite iron oxide particle comprising a core particle composed of $Fe_3O_4$ having a spinel structure and an outer layer composed of $CoFe_2O_4$ having a spinel structure, wherein crystals of the $CoFe_2O_4$ having a spinel structure are epitaxially grown on crystal planes of the $Fe_3O_4$ having a spinel structure, said particles being produced by a process comprising adding a mixed solution containing $Co^{2+}$ and $Fe^{2+}$ or a suspension containing hydroxides of $CO^{2+}$ and $Fe^{2+}$ in an amount of from not less than 2 moles to less than 3 moles of $Fe^{2+}$ based on one mole of $Co^{2+}$, to an alkaline dispersion with a pH of not less than 10 in which $Fe_3O_4$ particles are dispersed, while passing an oxygen-containing gas through said dispersion at a temperature between 50° C. and the boiling point, such that the total concentrations of Co ions and Fe ions in said alkaline dispersion are in the range of 0.005M to 0.5M.

11. The magnetic composite iron oxide particle according to claim 10, wherein said $Fe_3O_4$ particles are:

(1) granular $FesO_4$ particles produced form an aqueous solution by a wet process in which a ferrous precipitate obtained by reacting an aqueous solution of ferrous salt and an aqueous alkali solution is air-oxidized;

(2) granular $FesO_4$ particles produced from an aqueous solution by a wet process in which a suspension containing iron (III) oxide hydroxide particles or iron (III) oxide particles and ferrous hydroxide and having a pH of not less than 6 is heated at a temperature of not less than 40° C.;

(3) acicular magnetite particles produced from an aqueous solution by a wet process in which acicular magnetite particles obtained by dehydrating acicular lepidocrocite particles under heating at a temperature of 200° to 500° C. is dispersed in an alkaline suspension containing ferric hydroxide colloid, and the prepared suspension is stirred under heating at a temperature of 40° to 100° C. in a non-oxidizing atmosphere; or (4) acicular or spindle shaped $FesO_4$ particles obtained by a dry process in which the ferrous precipitate obtained by reacting an aqueous solution of ferrous salt and an aqueous alkali solution is air-oxidized and the resulting acicular or spindle iron (III) oxide hydroxide particles are reduced under heating in a reducing atmosphere.

12. The magnetic composite iron oxide particle according to claim 10, wherein said core particles are spherical, hexahedral or octahedral particles having an average particle size of 0.01 to 0.5 μm.

13. The magnetic composite iron oxide particle according to claim 10, wherein said core particles are acicular or spindle shaped particles having an average particle length of 0.01 to 0.5 μm and an average particle length/average particle width ratio of not less than 2.

14. The magnetic composite iron oxide particle according to claim 10, wherein the amount of $CoFe_2O_4$ is 10 to 80 wt % based on the composite iron oxide particle.

15. The magnetic composite iron oxide particle according to claim 10, having a coercive force of 100 to 3,000 Oe.

16. The magnetic composite iron oxide particles according to claim 10, wherein the change of saturation magnetization is within +10% based on the initial value thereof, the change of coercive force is within +10% based on the initial value thereof, and the change of $Fe^{2+}$ content in the particles is within ±10% based on the initial value thereof after standing for 120 days in an environment of 60° C. and 90% relative humidity.

17. The magnetic composite iron oxide particles according to claim 10, wherein the change of L* value of said magnetic composite iron oxide particle is within ±10% based on the initial value thereof, the change of a* value of said magnetic composite iron oxide particles is within ±10% based on the initial value thereof and the change of b* value of said magnetic composite iron oxide particle is within ±10% based on the initial value thereof, after standing for 120 days in an environment of 60° C. and 90% relative humidity, wherein L*, a* and b* are standard measurements of hue in uniform sensory space according to the CIE 1976 color.

18. A magnetic recording medium comprising a substrate, and a magnetic recording layer which is formed on the substrate and is composed of magnetic composite iron oxide particles as defined in claim 1, 8 or 10; and a binder.

* * * * *